April 18, 1944. W. HAGUE 2,346,963
ROW CROP HARVESTER AND HEADER
Filed March 7, 1942 2 Sheets-Sheet 1
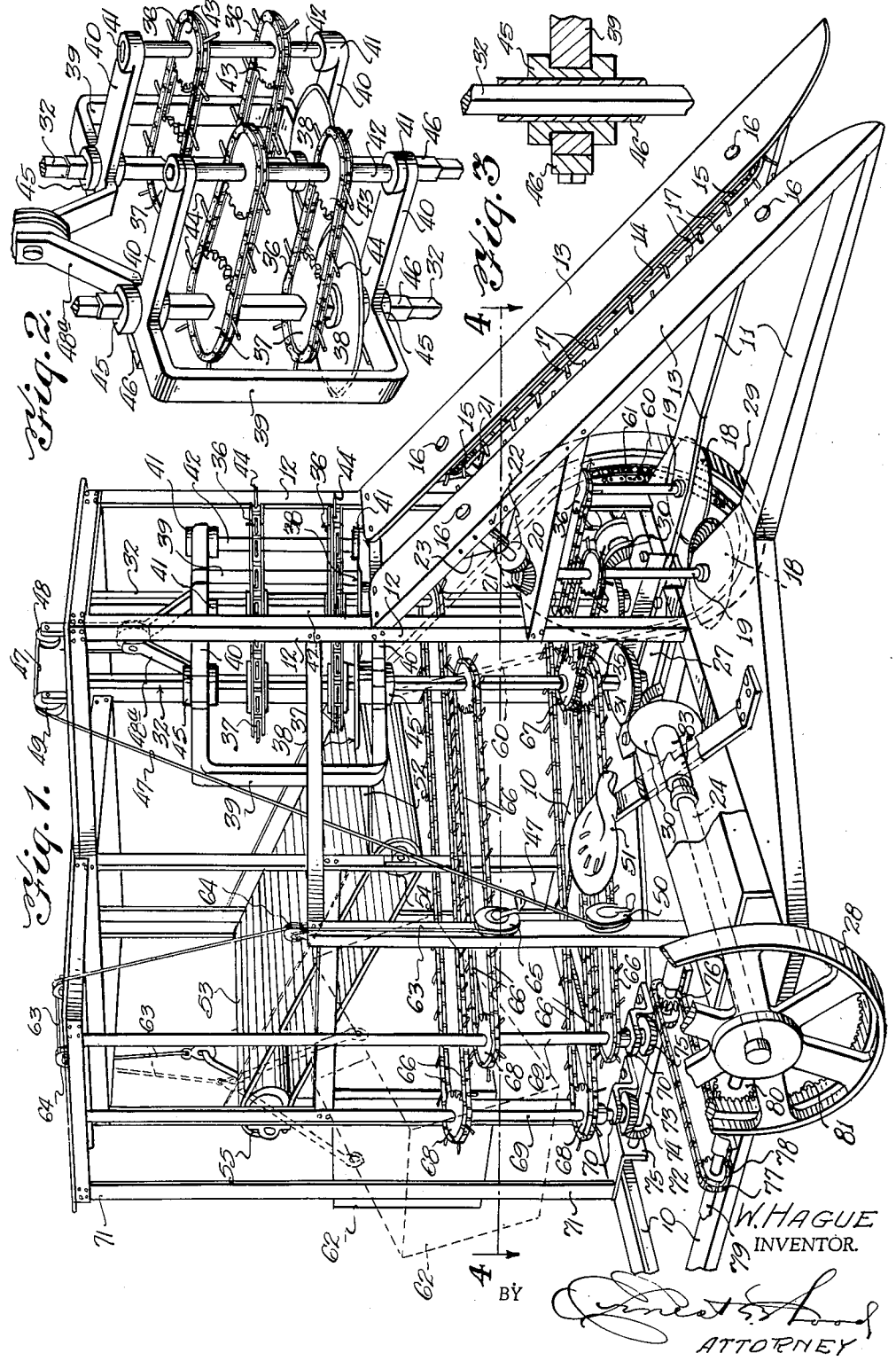
W. HAGUE
INVENTOR.

April 18, 1944. W. HAGUE 2,346,963
ROW CROP HARVESTER AND HEADER
Filed March 7, 1942 2 Sheets-Sheet 2
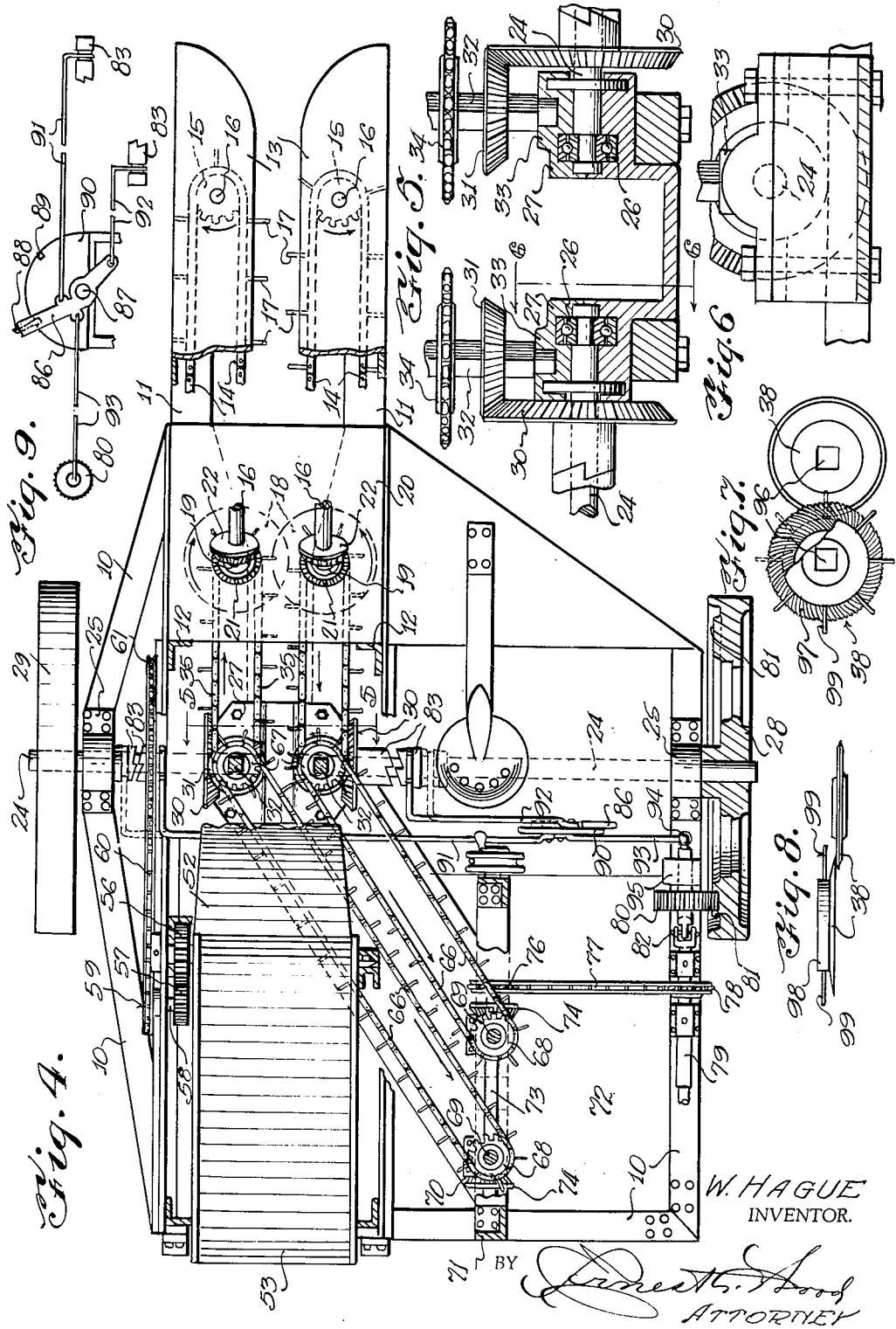
W. HAGUE
INVENTOR.

Patented Apr. 18, 1944

2,346,963

UNITED STATES PATENT OFFICE 2,346,963

ROW CROP HARVESTER AND HEADER

Wakefield Hague, Dallas, Tex.

Application March 7, 1942, Serial No. 433,692

3 Claims. (Cl. 56—59)

This invention relates to harvesting implements and it has particular reference to a machine for harvesting and heading row crops such as maize, kaffir corn, sorghum, cane, and the like.

The principal object of the invention is to provide a machine of the character set forth, possessed of the following novel advantages: First, means disposed forwardly of the machine, embracing the stalks, to guide the same and containing mechanism operating to constrain the stalks to remain in upright position for severance immediately above the ground. Second, co-operating cutting discs provided with means forcing the stalks into severing position relative to the discs. Third, heading mechanism vertically reciprocable to correspond to variations in height of the stalks, combined with means for manually reciprocating said heading mechanism, and fourth, separate means for disposing of the heads and stalk with the latter being transported to a point for binding.

The present invention seeks to improve upon machines generally for harvesting and heading row crops and while provision is made for transporting the stalks to a prearranged location in the machine frame preparatory to binding, no binder is shown inasmuch as any conventional type of binder may be installed in the machine to cooperate with the harvesting and heading mechanism to be described presently.

With the foregoing objects as paramount the invention has further reference to certain features of accomplishment to become manifest as the description proceeds, taken in connection with the accompanying drawings wherein:

Figure 1 is a perspective view of a harvesting and heading machine constructed according to the present invention.

Figure 2 is a detail perspective view of the header.

Figure 3 is fragmentary detail view, partly in section showing one of the collars retaining the header on its mounting for vertical sliding movement.

Figure 4 is a sectional view taken on line 4—4 on Figure 1.

Figure 5 is a sectional view of the trough through which the stalks are advanced immediately after severance and is taken on line 5—5 on Figure 4.

Figure 6 is a transverse section on line 6—6 on Figure 5.

Figure 7 is a detail plan view of the cutting disc assembly with feed, showing a portion of the latter broken away.

Figure 8 is an edge view of the discs shown in Figure 7, and

Figure 9 is a detail view showing the mechanism for operating the clutches.

Continuing with a more detailed description of the drawings, reference is primarily made to Figure 1, the perspective view, wherein 10 denotes the base frame or chassis of the machine and disposed in offset relation to the major axis of the chassis is a pair of relatively parallel and spaced apart beams 11. A pair of uprights 12 is mounted at the juncture of the beams 14 with the machine frame proper and joined to these uprights intermediate their tops and bottoms is a pair of inclined rails 13, whose outer and lower ends are joined to the outer ends of the beams 11. The ends of the rails and beams are deflected inward to guide the stalks to be harvested into the space between the members.

As a means for constraining stalks to stand upright as the machine is traversed along the row, a pair of endless chains 14 are mounted under the rails 13 and operate over sprockets 15 journaled on stub shafts 16 adjacent the upper and lower ends of the rails so that the inner leads of the chains will travel adjacent to and parallel with the confronting edges of the rails. The chains 14 are each provided with relatively spaced fingers 17 and since the chains are intended to travel at about the same speed as the forward speed of the machine, the stalks will be held by the fingers in upright position to be acted upon by the cutting discs 18 at the juncture of the beams 11 with the machine frame where the space between the beams gradually becomes narrower. Inasmuch as the invention includes as one of its outstanding features the construction of these discs, they will be referred to again in detail presently.

The discs are each mounted on a vertical shaft 19, the lower ends of which are journaled in the frame on either side of the stalk passage, the upper ends being journaled in a plate 20 which is joined to and extends outward from the uprights 12 and bolted or otherwise secured to the inclined rails 13. Beveled gears 21 are mounted on the upper ends of the shafts 19 which enmesh similar gears 22 mounted on the stub shafts 16 which also carry the upper sprockets 15 of the conveyor chains 14. The shafts 16 are journaled in bearings 23 (Figure 1) which are at right angles with respect to the rails 13 but oblique in relation to the axes of shafts 19.

Referring now to the main drive from which power is transmitted to operate the various moving parts of the machine it will be noted that the main axle 24 of the machine is in two coaxially arranged sections, the outer ends of each section being journaled in bearing 25, (Figure 4) bolted to the main frame, with their inner ends journaled in bearings 26 in a casting 27 (Figure 5) to which reference will be made again presently. Wheels 28 and 29 are mounted on the axle sections and support the machine frame and through rotation of these wheels, rotation is imparted to the axle sections 24. Mounted in confronting relation on the axle sections 24 are beveled gears 30 which enmesh similar but smaller gears 31, mounted on vertical square shafts 32. The lower ends of these square shafts are journaled in bosses 33 (Figure 5) in the large casting 27 and their upper ends are journaled in bearings (not shown) in the top of the frame as better seen in Figure 1. Accordingly, as the machine is moved along the ground, rotation of the axle 24 will impart rotation to the square shaft 32 but in opposite directions for reasons to become obvious presently.

Mounted on the lower ends of the square shafts 32 are sprockets 34, surrounding which are chains 35 which also surround sprockets 36 mounted on the vertical shafts 19. These chains are likewise provided with spaced fingers and serve to move the stalks inwardly into the machine after the discs 18 have severed them. It is here mentioned that while only one set of chains are shown for this purpose to avoid confusion in illustrating, it will be understood that for practical purposes, two or more sets are actually provided.

It is apparent from the foregoing that as the vertical square shafts 32 are rotated as explained, the vertical shafts 19 are also rotated by chains 35, to rotate sprockets 16 to operate chains 14.

After the stalks have been severed, which is effected by the discs 18, about four inches above the ground, they are conveyed by the chains 35, assisted at the tops by chains 36 in what is herein referred to as the header frame illustrated in detail in Figure 2, and which will now be described.

The header frame is slidable vertically on the square shafts 32 and yet certain elements therein are constrained to rotate. These elements consist of sprocket wheels 37 and cutting discs 38 which sever the heads from the stalks as the latter are borne thereagainst by combined action of chain assemblies 35 and 36.

The header frame consists of vertical members 39, joined to which are lateral, forwardly extending arms 40 at both top and bottom. These arms support bearings 41 at their outer ends, in which are journaled shafts 42 which carry vertically spaced sprocket wheels 43 about which the chains 36, previously mentioned, operate. These chains, like the lower cooperating chains 35, are provided with conveyor fingers 44 which move the stalks in a perpendicular plane into the cutting discs 38 which sever the heads from the stalks.

The header, as stated, is reciprocable on the vertical square shafts 32 and to accomplish this, the members 39 are recessed at the juncture between the members and the arms 40 to receive spool bearings 45 (Figure 3) which have square apertures conforming to and receiving square sleeves 46 which latter, in turn, are mounted for sliding movement on the square shafts 32. A plate 46 is bolted over the recess in which each spool 45 is disposed, to hold the latter is position.

It is apparent therefore that the spools 45 may rotate with the shafts 32, but the header frame remains stationary except for vertical displacement which is effected by means of a cable 47 by which it is suspended and which extends upward from bail 48a, (Figure 1) over sheaves 48 and 49, thence downward to winch 50 on which it is wound. This winch is disposed in a position convenient to the operation on the seat 51 and may be operated to vary the height of the header in relation to variations in height of the stalks. Suitable ratchet means of conventional design for winches may be employed to retain the winch 50 in a position when released.

After the heads have been severed from the stalks, they fall upon an apron 52 to be delivered to and carried rearwardly of the machine by the elevator 53.

The elevator 53 operates over rollers 54 and 55 (Figure 1), roller 54 being driven by means of a gear 56 (Figure 4) enmeshing a gear 57 which latter is mounted on a stub shaft 58, carrying a sprocket wheel 59. A chain 60 connects this sprocket wheel with a larger sprocket wheel 61 mounted on the shorter section of the machine axle 24. It is apparent, therefore, that as the machine moves forward to rotate axle 24, the stalks will first be severed at their bases by discs 18, after which their heads will be severed by discs 38 and the heads, falling on the elevator 53 will be conveyed thereby rearwardly and deposited into a receptacle 62 suspended by means of a cable 63 which latter extends upward, over sheaves 64, thence downward to a winch 65 on which it is wound (Figure 1). This winch, like winch 50, is mounted close to the operator's seat 51 for convenience in dumping the heads from the receptacle 62. One end of the receptacle is supported by means (not shown) and when slack is permitted in cable 63, the opposite end of the receptacle is lowered to release its contents, after which the cable is rewound on the winch to restore the receptacle to its original position.

The stalks whose heads have been severed are required to be moved obliquely toward the rear of the machine and to accomplish this, two or more vertically spaced sets of chains 66 are provided which surround sprocket wheels 67 on the square shafts 32 and sprocket wheels 68 on shafts 69 nearer the rear of the machine and whose lower ends are journaled in bearings 70 while the upper ends are received in bearings carried by a sub-frame 71. The relationship of these chains and their fingers is such that the stalk, after heading, is conveyed in an upright position toward the space 72 which is occupied by a binder (not shown) but which is of conventional construction. The stalks thus delivered are bound in a well-known manner and disposed of as by dumping onto the ground for shocking or into a suitable conveyance.

The chains 66 are driven by means of a shaft 73 which carries on either end a beveled gear 74 which gears enmesh similar gears 75 on the lower ends of shafts 68. A sprocket 76 is mounted on one end of the shaft 73 which is driven by a chain 77, surrounding a sprocket 78 on a shaft 79 adjacent to and parallel with the machine frame. This shaft 79 is driven by a gear 80 which meshes with the teeth of a ring gear 81 on the inside of the wheel 78 of the machine. A knuckle or universal joint 82 (Figure 4) is provided in the shaft between its ends in order that the gear 80 may be moved into and out of engagement with gear 81 to start and stop rotation of shaft 79 to start and stop the binder.

The clutches and their operating mechanism consist of the pairs of cooperating clutch elements 83, one element being fixed to its respective section of the axle while the companion element is slidable thereon and engageable with the fixed element to join them for common rotation, simultaneously with the engaging of the clutch elements to set into operation the square shafts 32; chains 35; chains 14; chains 36; disc cutters 18 and 38; the chains 66 are set in motion by the engaging of the gear 80 with the ring gear 81. Disconnection of all clutches to render all parts inoperative is also effected simultaneously. This is accomplished by the mechanism shown in Figure 9 in detail. This mechanism consists of a hand lever 86 rotatably mounted on a shaft 87 and is held in shifted position by means of a detent 88 which is urged into selected ones of a series of notches 89 in a quadrant 90.

Connected to the lever on its forward edge and above its point of rotation is a rod 91 which extends to and connected with the clutch element 83 of the right hand axle section 24 of the machine. To the lower end of the lever 86 is connected a rod 92 which extends to and operates the companion clutch element 83 on the other axle section. A third rod 93 is joined to lever 86 intermediate its ends and extends to and operates the movable section of shaft 79 which carries the gear 80 to cause the latter to move into and out of engagement with the ring gear 81.

From the foregoing it is apparent that by moving lever 86 to the right in Figure 9, rod 91 is moved to the right to cause the sliding clutch element 83 to retract from its companion fixed element, thereby stopping the elevator 53 as well as the right hand square shaft 32 and the elements operated thereby. Simultaneously, rod 92 is pulled to the left in Figure 1 to disengage clutch elements 83 to stop operation of the other shaft 32 and its associated elements. At the same time, rod 93 is moved to the right in Figure 9 to disengage gear 80 from gear 87 of the traction wheel 78 to stop the binder mechanism (not shown). The clutch operating means just described has been omitted from Figure 1 for the sake of clarity but has been illustrated in Figure 4.

The connection of the rod 93 with the end of shaft 79 is effected through the medium of a ball and socket assembly 94 for obvious reasons and the section of the shaft 79 which is moved by this rod is held in a horizontal plane by means of a bracket 95 (Figure 4) to counteract a tendency of the section to move upward, caused by the drag of the gears.

Special reference is here made to the peculiar construction of the cutting discs both as regards the discs for severing the stalks at their bases as well as those severing the heads, inasmuch as these disc assemblies may be interchangeable. The discs are shown in detail in Figures 7 and 8 and for convenience they are identified by the same reference numerals, 38, as the header cutting discs previously mentioned. These discs overlap slightly as shown and in the case of the header discs, they are each provided with a square central opening 96 to receive the square shafts 32. One disc is plain while the companion disc is milled as at 97, beginning at a point midway between the center and edge outward to the edge so that the cutting edge will be serrated. Integral with or fixed to the top of the milled disc is a plate 98 in the periphery of which is mounted a plurality of radially extending fingers 99. These fingers have the function of engaging the stalks and forcing the same between the discs to facilitate cutting. The plate 98 has been omitted in the showing of the discs in the other figures.

It is believed that since the foregoing description deals rather extensively with each part of the assembly and its operative relationship with companion parts, a description of the full operation of the machine will be unnecessary.

Manifestly, the construction as shown and described is capable of some modification and such modification as may be construed within the scope and meaning of the appended claims is also considered to be within the spirit and intent of the invention.

What is claimed is:

1. In a machine for harvesting and heading row crops, a wheeled frame, a pair of parallel guides forwardly of said frame defining a stalk receiving slot, conveyor means for stalks operating along the edges of said slot, cooperating cutting discs at the inner end of said slot for severing stalks at their bases, a pair of spaced, relatively parallel square shafts perpendicular to said frame, means for conveying severed stalks in upright position between said shafts, a header frame slidable vertically on said square shafts, a pair of relatively short shafts supported by said frame and disposed forwardly and in parallel relation to said square shafts, sprockets carried by said short shafts and said square shafts in alignment, chain conveyors on said sprockets, cutting discs mounted on and rotatable by said square shafts and movable with said header frame for severing the heads from said stalks, a cable supporting said frame, a winch on which said cable is wound for effecting vertical adjustment of said header frame, a traveling elevator for removing heads severed by the header discs, means for conveying stalks from said header frame to a point of disposal, and means for operating said conveyors and cutting discs from the wheels of said machine.

2. In a machine for harvesting and heading row crops, a wheeled frame, a stalk guide extending forwardly of said frame having conveyor means therein, a square shaft disposed vertically on each side of said guide, a pair of cooperating cutting discs mounted forwardly of said square shafts for severing stalks at the base, a vertically reciprocable header frame, a pair of relatively short shafts supported by said frame forwardly of said square shafts, aligned sprockets mounted on said square shafts and said short shafts, stalk conveyor chains surrounding said sprockets, cooperating discs mounted on said square shafts for reciprocation with said frame, a cable supporting said frame, means for manually actuating said cable to vertically reciprocate said header frame and discs to correspond to variations in height of stalks, a continuously moving elevator for transporting stalk heads to a point of disposal, conveyor means for transporting stalks in upright position to a point of disposal and clutch controlled means for operating said conveyor means, cutting discs and elevator from the wheels of said machine.

3. A machine for harvesting and heading maize, kaffir corn, and the like, comprising a wheeled frame, a stalk guide forwardly of said frame, inclined conveyor means in said guide, a pair of cooperating cutting discs at the inner end of said guide for severing stalks at the base, a square shaft disposed on each side of said stalk guide, a header frame mounted for vertical movement on said square shafts, a pair of short shafts mounted in said frame in parallel relation to said square shafts, sprockets mounted in aligned relation on said square shafts and short shafts, conveyor chains surrounding said sprockets, a pair of cooperating cutting discs rotatably mounted in said header frame for severing heads from said stalks, a cable supporting said header frame for vertical movement, means for transporting heads from the severing point, a tiltable receptacle for said heads, means for transporting stalks in upright position from said severing point to a point of disposal and clutch controlled means for operating said stalk transporting means and cutting discs from the wheels of said machine.

WAKEFIELD HAGUE.